United States Patent [19]

Schwarz et al.

[11] Patent Number: 5,173,246

[45] Date of Patent: Dec. 22, 1992

[54] DEVICE FOR THE SURFACE HARDENING OF WORKPIECES OF DIFFERENT LENGTHS

[75] Inventors: Hans-Rudolf Schwarz, Wermelskirchen; Friedrich Moritz Oertel, Hückeswagen, both of Fed. Rep. of Germany

[73] Assignee: AEG-Elotherm GmbH, Remscheid-Hasten, Fed. Rep. of Germany

[21] Appl. No.: 572,999

[22] PCT Filed: Dec. 22, 1989

[86] PCT No.: PCT/EP89/01601

§ 371 Date: Aug. 20, 1990

§ 102(e) Date: Aug. 20, 1990

[87] PCT Pub. No.: WO90/07594

PCT Pub. Date: Jul. 12, 1990

[30] Foreign Application Priority Data

Dec. 23, 1988 [DE] Fed. Rep. of Germany ....... 3843457

[51] Int. Cl.⁵ .................................................. C21D 1/10
[52] U.S. Cl. ...................................... 266/129; 266/249
[58] Field of Search ............... 266/129, 249, 103, 104; 148/129

[56] References Cited

U.S. PATENT DOCUMENTS 3,842,234 10/1974 Seyfried ............................. 266/129

FOREIGN PATENT DOCUMENTS 3909117 1/1990 Fed. Rep. of Germany ...... 266/129
1134578 11/1968 United Kingdom .

Primary Examiner—Scott Kastler
Attorney, Agent, or Firm—Sprung Horn Kramer & Woods

[57] ABSTRACT

The invention relates to a device for hardening the surface of workpieces of different lengths, having: two clamping heads and a rotary drive, for clamping and rotating the workpiece to be hardened; inductors for the electroinductive heating of the workpiece surface; and a quenching spray.

The characterizing feature of the invention is that disposed on opposite sides of the workpiece with provision for displacement in relation to one another in the direction of the workpiece axis for adaptation to the particular workpiece length are two line inductors (1a, 1b), each having two parallel conductor portions (2a, 2b) and end portions (5, 6) which are bent at right angles and an end portion (6a, 6b) of each of which extends arcuately or polygonally, more particularly at right angles, over the workpiece (4).

4 Claims, 1 Drawing Sheet

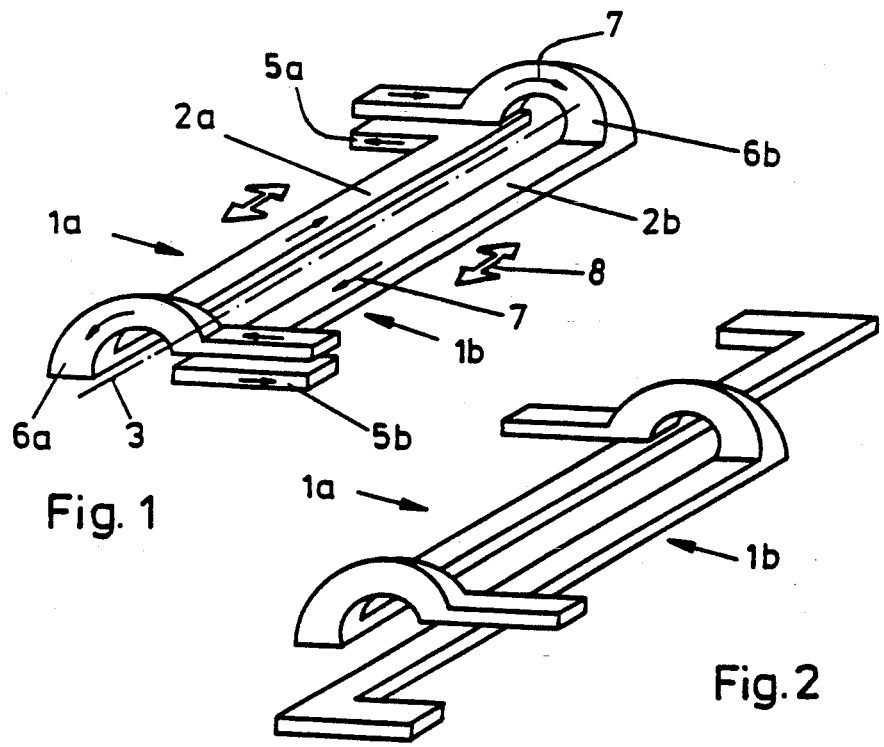
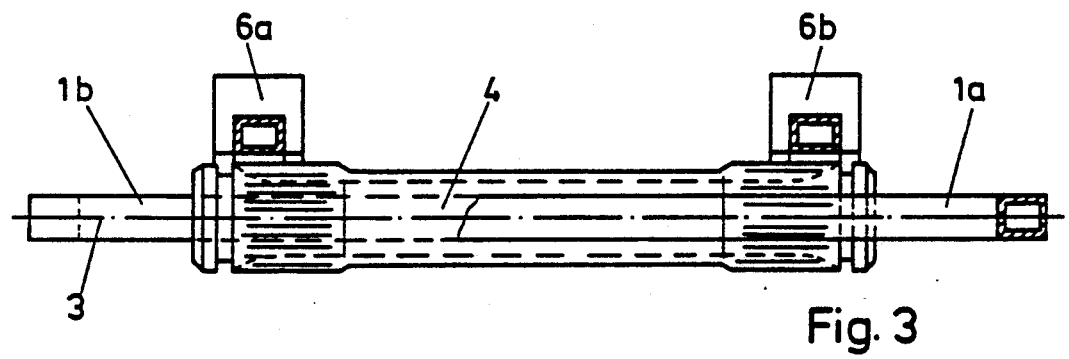
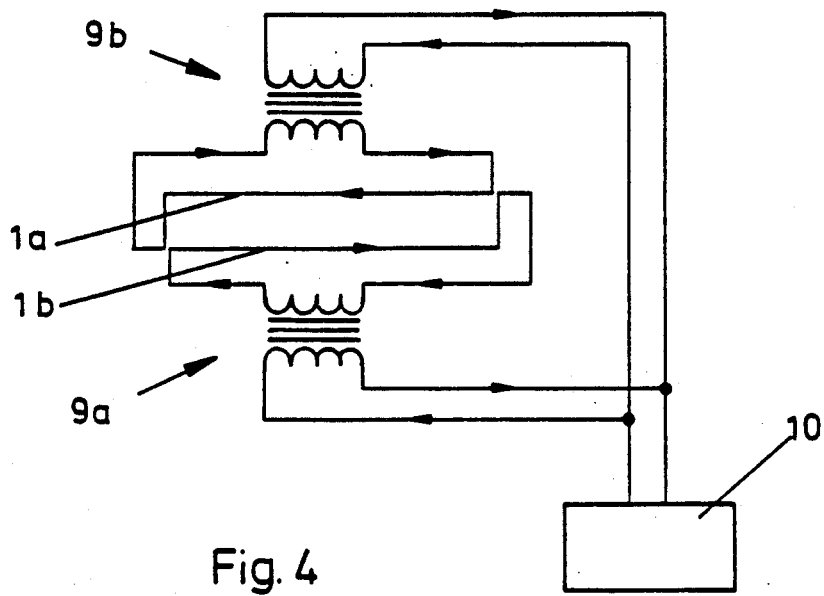

DEVICE FOR THE SURFACE HARDENING OF WORKPIECES OF DIFFERENT LENGTHS

FIELD OF THE INVENTION

The invention relates to a device for hardening the surface of workpieces of different lengths, having: two clamping heads and a rotary drive, for clamping and rotating the workpiece to be hardened; inductors for the electroinductive heating of the workpiece surface; and a quenching spray.

BACKGROUND OF THE INVENTION

In a prior art electroinductive hardening devices of the kind specified have been used for many years. Problems occur if not always workpieces of the same length, but of different lengths must be hardened. Since the edges of the workpieces must remain unhardened, to reduce the risk of shelling, the inductors must be precisely adapted to the length of the workpiece to be hardened. When workpieces of different lengths were hardened, therefore, the inductors had to be interchanged and an inductor used which corresponded to the length of the workpiece to be hardened. This procedure means that a correspondingly large number of inductors must be kept in stock and moreover the changeover time is lost to production.

It is an object of the invention to provide a device for the electroinductive surface hardening of workpieces which shortens the changeover time for the adaptation of the inductors to the particular length of the workpiece to be hardened and more particularly obviates any interchange of inductors and the loss of time resulting therefrom.

SUMMARY OF THE INVENTION

To this end, in a device of the kind specified according to the invention disposed on opposite sides of the workpiece with provision for displacement in relation to one another in the direction of the workpiece axis for adaptation to the particular workpiece length are two line inductors, each having two parallel conductor portions and end portions which are bent at right angles and an end portion of each of which extends arcuately or polygonally, more particularly at right angles, over the workpiece.

By the adjustment according to the invention of the two parallel line inductors receiving the workpiece between them, adaptation to the particular workpiece length can be achieved in a very simple manner, without the need for interchanging inductors. The line inductors are each displaced, for example, manually via sliding posts, via spindles, or in the case of large all-automatic flexible hardening machines via numerically controlled shafts, until the arcuate or polygonal end portions of the two line inductors are situated a short distance in front of the respective end face of the workpiece. Either only one line inductor can be displaced in relation to the other, fixed inductor, or both line inductors can be displaced towards one another. For adaptation to workpieces of different diameters, in the device according to the invention the two line inductors can also be shifted in relation to one another—i.e., transversely of the axis of the workpiece.

If according to an advantageous feature of the device according to the invention a transformer is associated with each line inductor, the result is a complete displaceable structural unit comprising line inductor and associated transformer.

Also preferably the two transformers are supplied from a single power source.

The device according to the invention is suitable for shafts, drive shafts, racks and other elongate engine and machine parts.

BRIEF DESCRIPTION OF THE DRAWINGS

The invention will be explained in detail with reference to the drawings, wherein:

FIG. 1 is a perspective view of the two line inductors in an operating position, FIG. 2 shows them in an altered operating position, FIG. 3 is a longitudinal section through the inductor unit, and FIG. 4 is a connection diagram of the circuit of the two line inductors.

Each of two identically shaped line inductors 1a, 1b has a straight conductor portion 2a, 2b which extends parallel with the axis 3 of a workpiece 4. The two straight conductor portions 2a, 2b are disposed on opposite sides of the workpiece 4—i.e., they receive the workpiece 4 to be hardened between them. One end portion 5a, 5b of the line inductors 1a, 1b is bent smoothly at right angles, while the opposite end portion 6a, 6b partially engages around the workpiece 4 in arcuate form. As stated, the end portion 6a, 6b can also be polygonal.

From the operating position shown in FIG. 1, the two line inductors 1a, 1b can be displaced in opposite directions, indicated by double arrow 8, parallel with the axis 3 of the workpiece 4, for example, into the operating position shown in FIG. 2, to harden a shorter workpiece 4.

A tranformer 9a, 9b is associated with each line inductor 1a, 1b (FIG. 4). The two transformers 9a, 9b are connected to a common power source 10. The direction of current in the line inductors 1a, 1b is marked by arrows 7.

What is claimed is:

1. A device for hardening the surface of workpieces of different lengths, having: two clamping heads and a rotary drive, for clamping and rotating the workpiece to be hardened; inductors for the electroinductive heating of the workpiece surface; and a quenching spray, wherein disposed on opposite sides of the workpiece with provision for displacement in relation to one another in the direction of the workpiece axis for adaptation to this particular workpiece length are two separate line inductors (1a, 1b), having two parallel conductor portions (2a, 2b) extending parallel to each other and to an axis of the workpiece and two end portions (5, 6) which are bent at right angles to the conductor portion and having a portion (6a, 6b) which extends arcuately or polygonally at right angles over the workpiece (4).

2. A device according to claim 1, wherein the line inductors (1a, 1b) can be displaced in relation to one another, while maintaining their distance apart, in the direction of the longitudinal extension of the conductor portions (2a, 2b).

3. A device according to claim 1, wherein the conductor portions (2a, 2b) can be displaced in relation to one another, while altering their distance apart, in the axial direction of the workpiece (4) for adaptation to the diameter thereof.

4. A device according to claim 1, wherein the two line inductors (1a, 1b) are each connected to a power source (10) via a transformer (9a, 9b).

* * * * *